T. PENROSE.
HORSE HAY-RAKE.
No. 172,164. Patented Jan. 11, 1876.
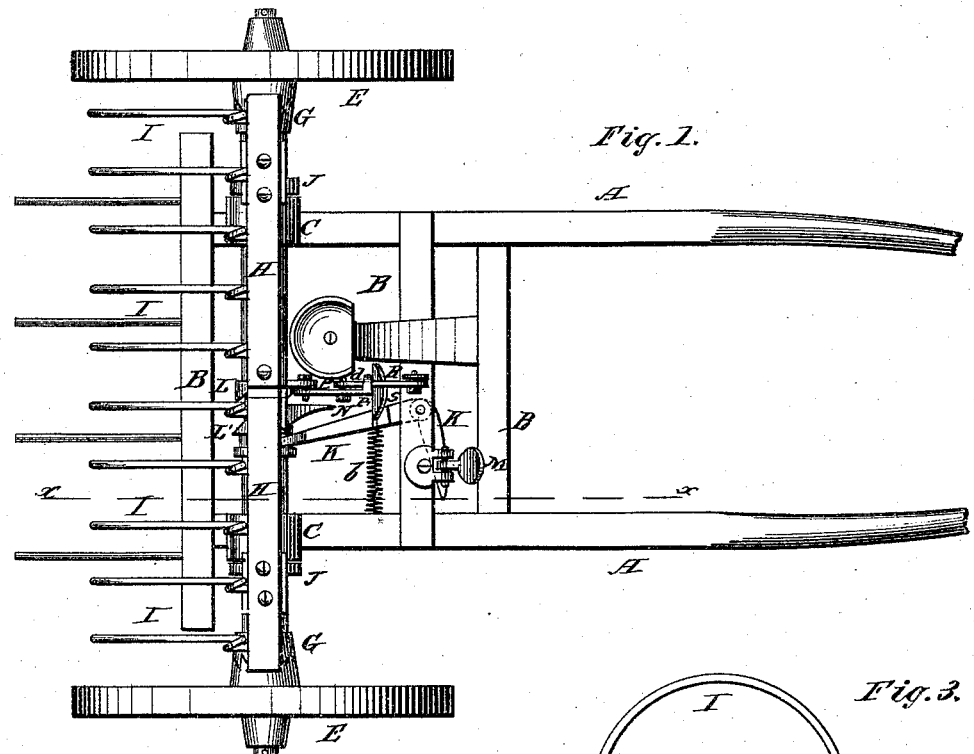
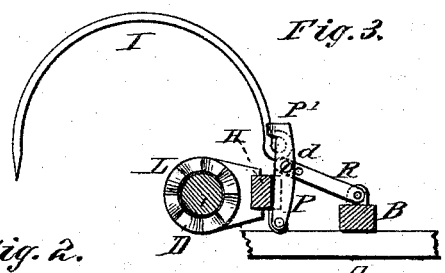
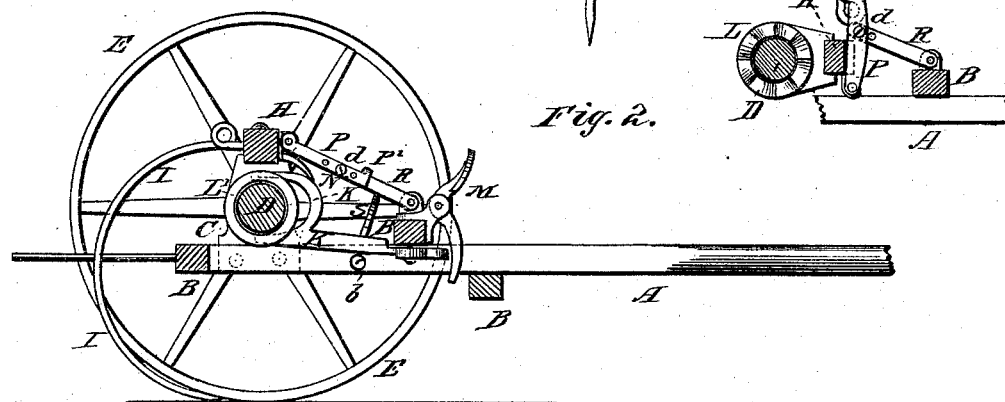
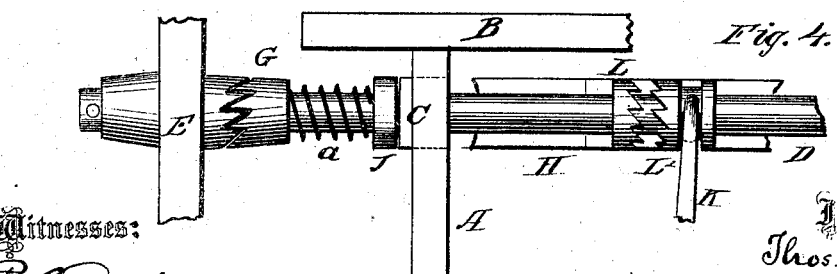

UNITED STATES PATENT OFFICE.

THOMAS PENROSE, OF NEW GARDEN, OHIO.

IMPROVEMENT IN HORSE HAY-RAKES.

Specification forming part of Letters Patent No. 172,164, dated January 11, 1876; application filed November 29, 1875.

*To all whom it may concern:*

Be it known that I, THOMAS PENROSE, of New Garden, in the county of Columbiana and State of Ohio, have invented certain new and useful Improvements in Horse Hay-Rakes; and I do hereby declare that the following is a full, clear, and exact description thereof, which will enable others skilled in the art to which it appertains to make and use the same, reference being had to the accompanying drawings, and to the letters of reference marked thereon, which form a part of this specification:

My invention relates to horse hay-rakes; and it consists in the construction and arrangement of the devices for dumping the rake, and of those for holding it to its work, as will be hereinafter more fully set forth.

In the annexed drawing, Figure 1 is a plan view. Fig. 2 is a section on line $x\ x$, Fig. 1. Figs. 3 and 4 are details of various parts of my invention.

A A represent the shafts of the sulky connected by one or more cross-bars, B, and having upon their rear ends suitable boxes or bearings C C for the axle D. On each end of the axle is loosely placed a driving-wheel, E, the inner end of the hub of which is toothed, as shown, and the wheel connected to the axle by means of a clutch, G, feathered upon the axle and held against the toothed hub by means of a spring, $a$.

It will be seen that by these means the axle is rotated when the rake is moving forward; or, in other words, when either one or both of the wheels turn forward, while the backward turning of the wheels does not affect the axle.

H is the rake-head, provided with spring-teeth I, of any suitable construction. On the under side of the rake-head H are secured two boxes, J J, through which the axle D passes, and the rake-head is connected with the axle by means of a two-part clutch, L L'. The part L of the clutch is fastened to the under side of the rake-head, and the axle passes loosely through the same, while the part L' is feathered on the axle and movable thereon. This clutch L' is grooved circumferentially, and the forked end of an L-shaped lever, K, is placed in said groove, the lever being pivoted at its angle to the cross-bar B, and acted upon by a spring, $b$, in such a manner as to hold the clutch L' away from the clutch L. On the front of the cross-bar B is pivoted a foot-lever, M, the lower end of which bears against the other arm of the lever K. When it is desired to dump the rake the driver places his foot on the lever M and presses thereon, which causes the lever K to turn sufficiently upon its pivot to throw the clutch L' in gear with the clutch L, and as the rake is moving forward the rake-head is turned one-fourth of a revolution forward, allowing the hay to slip off from the teeth. On the front of the rake-head is a wedge-shaped projection, N, which, as the rake turns forward, forces the lever K outward again to disengage the clutches. On the rake-head H is pivoted an arm or bar, P, and a similar arm or bar, R, is pivoted on the cross-bar B. These two bars are also pivoted together by a bolt, $d$, and the bar P is extended beyond said pivot-point, forming a lock, P', to hold said bars rigidly in the same line when the rake-head is in proper position for work. On the lever K is a projection, S, which passes under the lock-bars and breaks the joint, when said lever is moved to throw the clutches in gear.

Having thus fully described my invention, what I claim as new, and desire to secure by Letters Patent, is—

1. The clutches L L' and lever K, in combination with the foot-lever M, bars P R, and lock P', constructed and arranged substantially as and for the purpose specified.

2. The projection S on the lever K, in combination with the lock-bars P R, for the purposes herein set forth.

In testimony that I claim the foregoing as my own I affix my signature in presence of two witnesses.

THOMAS PENROSE.

Witnesses:
CHS. HOUGHTON,
JOHN R. BULLARD.